March 29, 1949.    E. W. BARNHART    2,465,508
STEERING MECHANISM FOR PORTABLE
HOISTS OR EXCAVATORS
Filed Oct. 15, 1945    2 Sheets-Sheet 1
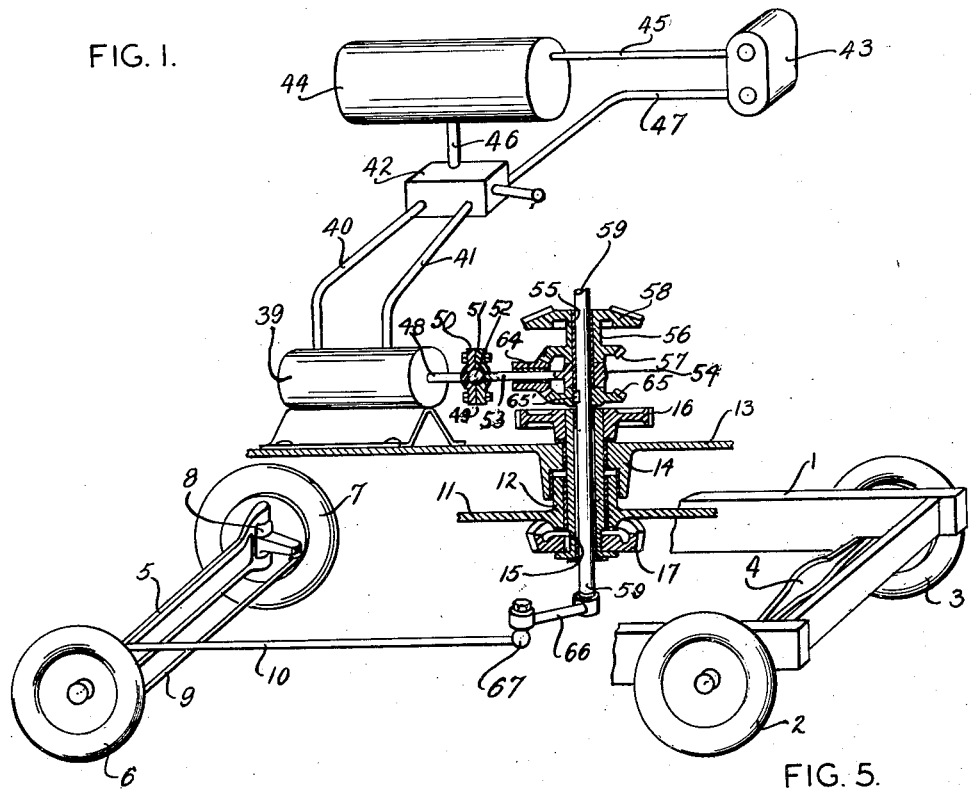
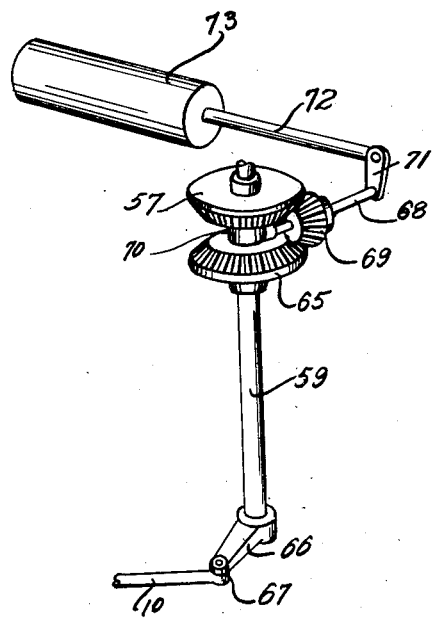
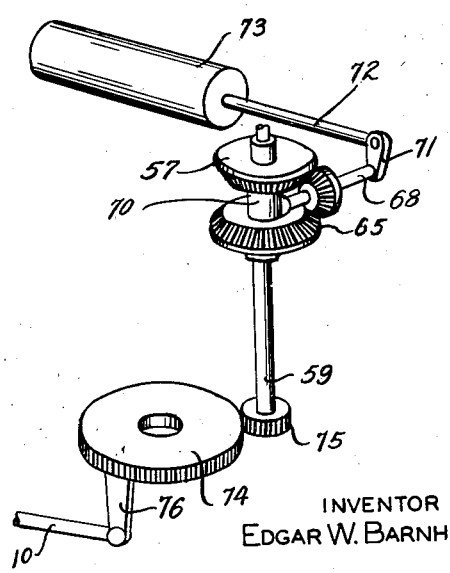
INVENTOR
EDGAR W. BARNHART
BY *Alfred F. ...*
ATTORNEY March 29, 1949.
E. W. BARNHART
2,465,508
STEERING MECHANISM FOR PORTABLE
HOISTS OR EXCAVATORS
Filed Oct. 15, 1945
2 Sheets-Sheet 2
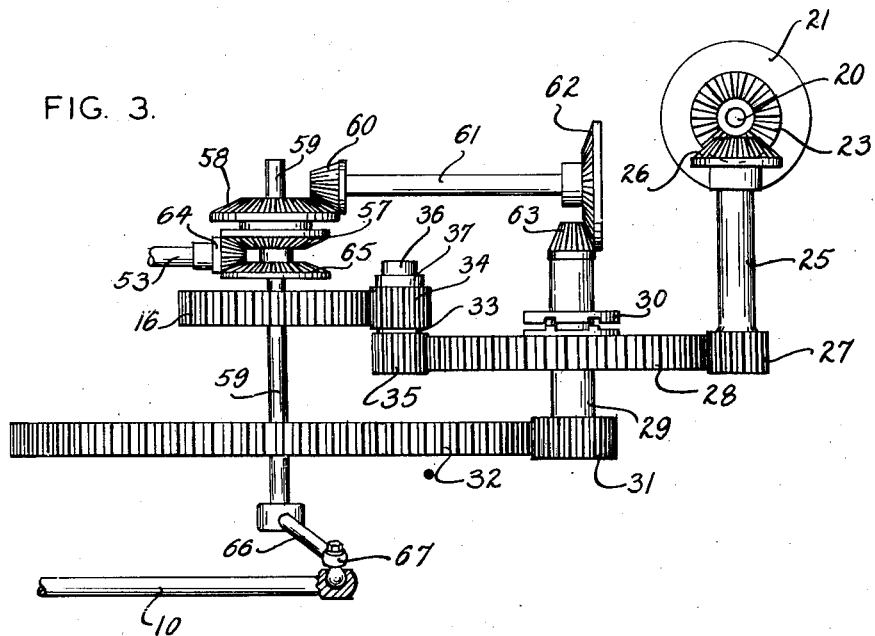
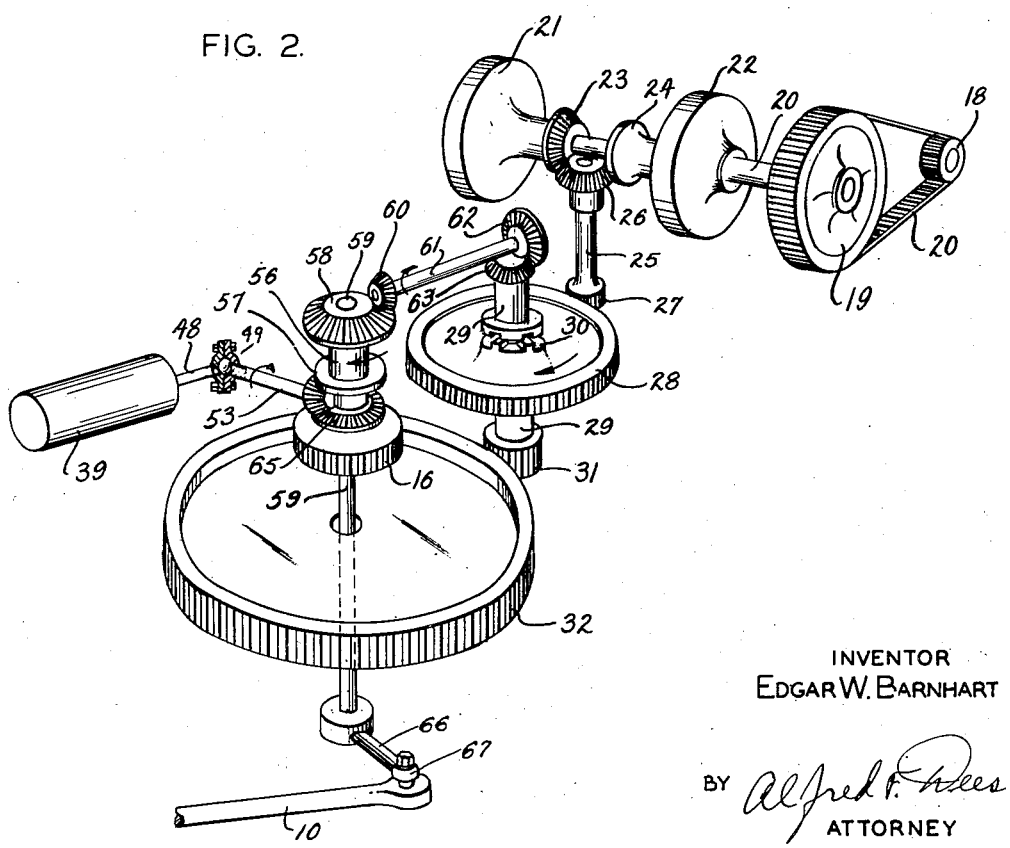
INVENTOR
EDGAR W. BARNHART
BY Alfred F. Rees
ATTORNEY Patented Mar. 29, 1949

2,465,508

UNITED STATES PATENT OFFICE 2,465,508

STEERING MECHANISM FOR PORTABLE HOISTS OR EXCAVATORS

Edgar W. Barnhart, Marion, Ohio, assignor to The General Excavator Company, Marion, Ohio, a corporation of Ohio Application October 15, 1945, Serial No. 622,405

16 Claims. (Cl. 180—79.2)

This invention relates to portable self-propelled hoists and excavators and in its more specific aspects is directed to an improved steering mechanism therefor.

One of the objects of the invention is to provide a steering mechanism for a portable self-propelled hoist or excavator which is interlocked with the swing and travel mechanism of such devices.

Another object of the invention is to provide a steering mechanism for a self-propelled portable hoist or excavator having the power steering unit therefor mounted on the swingable upper body or deck interlocked with the swing and travel mechanisms to steer the hoist or excavator in any rotated position of the upper body relative to the chassis supporting same.

A further object of the invention is to provide a power operated steering mechanism for a portable self-propelled excavator or hoist in which a selectively operable hydraulic mechanism reversely operates a shaft for steering the hoist or excavator and in which the shaft is operatively associated with the swing and travel mechanism.

Another and further object of the invention is to provide in a portable self-propelled excavator a reversely operable power steering mechanism operated through a gear mechanism suitably associated with the operating parts of the device to effect the steering action in any rotated position of the deck or upper body with respect to the chassis.

Another and further object of the invention is to provide a power or motor operated steering mechanism having a portion pressure fluid actuated and a portion mechanical and in which a part of the mechanical portion is disposed in the journal connecting the deck and chassis supported frame, the control for said mechanism located at the operator's station.

Another and still further object of the invention is to provide a pressure fluid steering mechanism for a pneumatically or solid tired hoist or excavator chassis in which a portion of said mechanism is concentrically disposed in the deck journal and shaft mechanism that is mechanically linked to the pair of wheels of said chassis employed in steering and controllable in any rotative position of said deck.

Other and further objects of the invention will occur to those skilled in the arts to which this invention relates as the description proceeds which taken in connection with the accompanying drawings sets forth a preferred embodiment thereof, with selected modifications thereof but such disclosures are not to be construed as a limitation of the invention which is limited only by the appended claims and any and all modifications, alterations and variations of structure coming within the spirit and scope thereof are deemed to be included herein.

In the drawings:

Fig. 1 shows a schematic perspective view partly in section of a hoist chassis steering control.

Fig. 2 is a perspective view of the swing and travel control connection with the steering mechanism.

Fig. 3 shows a side elevational view thereof.

Figs. 4 and 5 show schematic modified steering controls.

This is a continuation in part, of previous application S. N. 504,198, filed September 28, 1943, entitled "Steering mechanism for portable hoists and excavators," which has been issued as U. S. Patent No. 2,417,963.

The advent of solid or pneumatically tired chassis for shovels, hoists, excavators, etc., has introduced the element of high traverse speed of the chassis over the ground and because of the fact that the device must be steered from the operator's station on the rotatable deck the usual type of motor truck and tractor steering devices are not employable, the latter expedient not permitting any swinging motion of the steering control. The higher speed chassis has necessitated the adoption of a transmission unit comparable to that of a motor truck and the elimination of the dual clutch of the track laying traction unit or caterpillar tread. It is necessary that the operator steer the excavator or hoist from his station and with the pivoted front wheels characteristic of the motor truck and requiring great force to pivot the wheels some form of power unit is necessary that will be flexible and capable of transmitting power through the deck journal and thence applying it to the forward wheels for steering the chassis. Furthermore, the weight of these machines is such that hand steering is difficult and in some cases very nearly impossible. The operator in view of being required to attend to a number of other controls cannot give undivided attention to steering so must have something that will respond quickly and positively. This has been provided in the device disclosed in the accompanying drawings which is not only simple to operate but is definite and certain in its action, economical to manufacture, functioning in any rotatable position of the deck relative to the chassis, easy to maintain and which transmits power from the upper side of the deck to the front wheel twisting mechanism below the deck associated with the chassis with no interference with the rotative movement of the deck on its journal.

The above objects and advantages are obtained in the preferred embodiment of the invention set forth in Figs. 1, 2 and 3 of the drawings. A chassis frame 1 is supported on rear drive wheels 2 and 3 rotatably mounted on conventional axles (not shown) received in an automotive type differential housing 4. The forward end of chassis frame 1 is supported on axle 5 on which wheels 6 and 7 are rotatably mounted on pivoted steering knuckle pin assemblies, one of which is indicated by numeral 8 and the other is not shown. The twisting of the wheels in unison is accomplished by cross member 9. A suitable bell crank (not shown) but illustrated in the application referred to above illustrates how motion originating in the rotatable body is transmitted to the cross member 9 from the rod 10.

An upper body support 11 schematically illustrated is adapted to be supported on the chassis frame 1. Support 11 is provided with a boss 12 the outer face of which is intended to function as a bearing surface on which the platform or deck 13 of the rotatable upper body is mounted. The term "deck" as employed in this description is intended to be synonymous with and the full equivalent of the term "upper body" as it is employed in the portable self-propeller excavator or hoist art. Deck 13 is bossed at 14 to fit boss 12 and may be equipped with bearings customarily provided at this point which enables the deck 13 to freely rotate or swing relative to the chassis frame 1 and support 11.

Disposed within the journal formed by bosses 12 and 14 is a hollow or tubular shaft 15 rotatably supported in the journal in suitable bearings. Secured to one end of the shaft 15 is travel gear 16 which rests on and is rotatably supported on a bearing surface provided on the deck 13. Secured on the other end of tubular shaft 15 is a gear 17 which in practice is operatively connected through a suitable torque tube drive shaft and gearing (not shown) with the axle mechanism in housing 4. This connection is well known in the art and further details thereof as well as other mechanism are disclosed in greater detail in Bulletin G-4120 published by The General Excavator Company of Marion, Ohio. Gear 16 receives power from a suitable prime mover carried on the deck or in the upper body of the portable hoist or excavator as will be subsequently set forth.

Figs. 2 and 3 schematically show a swing and travel transmission which originates in a gear 18 driven directly by a suitable prime mover mounted on deck 13. This gear drives a gear 19 by means of a power transmitting means 20 which in the instant illustration is a gear chain belt. Gear 19 is secured to a shaft 20 on which are mounted two clutch members 21 and 22 which have gears 23 and 24 respectively associated therewith. A countershaft 25 suitably mounted for rotation in the upper body has a bevel gear 26 mounted on one end thereof meshing with gears 23 and 24 and has a gear 27 formed on the other end thereof. Clutch and gear elements 21, 23 and 22, 24 are a portion of a conventional reversing mechanism. By means of this device shaft 25 may be reversely rotated.

Gear 27 meshes with a gear 28 concentrically disposed about a riser shaft 29 that is suitably mounted in the deck 13. A swing control clutch 30 connects gear 28 to shaft 29. On the lower end of shaft 29 a gear 31 is secured that meshes with gear 32. Deck 13 is associated with gear 32 such that it may be swung about journal elements 12 and 14 and on the axis therethrough. The manner of assembling deck 13 on gear 32 is well known in the art and is further illustrated in the above identified bulletin. The transmission thus far described constitutes the essential elements of the swing mechanism for the upper body and the mechanism associated therewith.

The travel mechanism customarily arranged in parallel with the swing mechanism comprises a gear cluster 33 composed of gear elements 34 and 35 mounted on a shaft 36, gear 34 meshing with gear 16 mounted on center shaft 15 and gear 35 meshes with gear 28. Shaft 36 is suitably journaled on deck 13 and a clutch 37 is associated with shaft 36 and gear 34 to disconnect gear 34 from gear 35 in order to control the travel of the hoist or excavator chassis.

The steering mechanism originates in a reciprocating type pressure fluid motor 39, mounted on deck 13, to which supply conduits 40 and 41 are connected and they are also connected to a manually operated reversing valve 42 to control the motion of motor 39. A suitable pump 43 preferably driven from the engine or other prime mover customarily found on the deck 13 of the hoist or excavator and incorporating suitable controls exhausts pressure fluid into pressure reserve tank 44 through conduit 45 and by means of conduit 46 pressure fluid is conducted to reversing valve 42 to be conducted to one or the other end of motor 39 depending upon the direction of steering desired. An exhaust conduit 47 conducts fluid from valve 42 to the intake side of pump 43. Wherever air is used as a pressure fluid medium this particular conduit 47 may be eliminated.

The motor 39 has a piston rod 48 which at its one end is connected to the piston (not shown) in motor 39. Piston rod 48 is provided with a split socket 49 at its outer end comprising a member 50 secured in some appropriate manner to the piston rod 48 and complemental member 51 removably secured to the member 50 by suitable screw elements. The two members 50 and 51 each have a substantially hemispherical cavity therein which receives ball 52 integral with rod 53. The piston rod 48 moves substantially transversely of the rod 53 and the ball and socket members 49 and 52 permit this movement without damage to either member.

The rod 53 has an enlargement 54 which is bored to receive a bearing member 55 on which gear cluster 56 comprising gears 57 and 58 is mounted. The gear cluster 56 and the bearing 55 therein are mounted for rotation on and relative to rod 59 concentrically disposed with respect to the shaft 15 and mounted for relative rotation therein in suitable journals. Gear 58 meshes with a gear 60 which is mounted on one end of a shaft 61 that is arranged in suitable journals (not shown) mounted on the deck 13. A gear 62 is fixed to the opposite end of the shaft 61 and meshes with a gear 63 secured to the shaft 29. This schematically illustrates the interconnection between the swing transmission mechanism so arranged for reasons to be subsequently set forth.

A gear 64, provided with an extended hub, is rotatably mounted on the rod 53 and meshes with the gear 57 of cluster 56 and also meshes with gear 65 secured to the shaft 59 by keying or otherwise appropriately securing same thereto. Gear 65 is rigidly secured to the shaft 59 by means of key 65' and holds the shaft in position relative to the travel mechanism shaft 15 and associated gears. Suitable bearing surfaces are provided on the gears 16 and 65 to allow relative rotation. Rod 59 extends sufficiently below the shaft 15 such that a crank 66 secured thereto may be connected to steering rod 10. A suitable joint 67, well known in the art, connects the crank 66 and rod 10.

Figs. 4 and 5 show modified structures and only as much of the modified structure as is necessary to show the essential structure is disclosed. All other mechanism is identical with that of Figs. 1–3 and for the sake of clarity is not illustrated in connection therewith.

The gears 57 and 65 bear the same relationship to shaft 59 in Fig. 5 as they do in Figs. 1–3. The rod 68 on which gear 69 is mounted meshes with gears 57 and 69. Shaft 68 is mounted for rotation in a member 70 which is mounted on shaft 59 between gears 57 and 65 and for relative rotation with respect to the shaft 59. A crank 71 is fixed to the shaft 68 to which the piston rod 72 of motor 73 is secured. Motor 73 may be controlled by devices similar to those shown in Fig. 1. The shaft 68 may be supported for rotation in an additional journal (not shown) carried on deck 13. Motor 73 is mounted upon the deck 13 for movement therewith. A suitable joint or connection is provided between crank 71 and the piston rod 72 such that rotative movement may be imparted to shaft 68 whenever desired.

The disclosure of Fig. 5 as indicated from the reference numerals is identical with that of Fig. 4 but the rod 59 is not concentric with the shaft 15. Gear 74 in this instance is concentric with shaft 15 and is suitably supported therein. The rod 59 has a gear 75 thereon which meshes with gear 74. A member 76 secured to gear 74 is connectable by means of a suitable joint to the steering rod 10.

Each of these disclosures has been shown schematically in order to better portray the mode of operation and to avoid confusion of the essential mechanism herein set forth with the conventional structure of the portable self-propelled hoist or excavator.

The operation of the above described device depends upon the relative rotation of the several gear mechanisms. When, for example, the swing mechanism is rotating, gear 64 will roll relative to the gear 65 which is held stationary because of its direct connection to the front wheels of the device and because the motor 39 is rigidly connected to the deck 13. This being true the motor moves with the deck therefore about shaft 59 as an axis and causes gear 64 to roll relatively to stationary gear 65.

When it is necessary to twist or steer the front wheels and axle of the vehicle the upper body or deck 13 is held stationary. Motor 39 is then actuated by shifting of its reversing valve in one direction or the other and its piston rod 48 will pivot the shaft or rod 53 about 59 as an axis and in rotating rod 53 it will carry gear 64 along with it thereby rotating gear 65 and rod 53 about shaft 59 as an axis. Gear 64 under this condition will roll relative to gear 57 because gear 57 is stationary and therefore rod 53 will rotate about bearing 55. Reversely moving piston rod 48 will reversely rotate shaft 59 for the same reason as set forth above. The motion or action of motor 39 and rod 53 is stopped by the appropriate valve when all vehicle wheels are in alignment.

One typical phase of operation for the device will be assumed in which the swing mechanism is disengaged with the transmission associated therewith being held at rest by the friction of the parts comprising the swing mechanism. The travel mechanism is engaged and is the condition of the device when the excavator or hoist has to be steered.

Now assume that the travel mechanism is disengaged and the swing mechanism engaged. Assume further that the upper body or deck is swinging in such a direction that the shafts 29 and 53 will rotate in the direction of the arrows thereabout, or clockwise when viewed from above. Since the machine will not be traveling there will be no necessity for steering. Upon rotation of the upper body or deck in the direction indicated above, gear 31 will turn as shown by the arrow marked on it. Referring now to the steering mechanism, shaft 56 does not turn relative to the center shaft 59 having gear 65 secured thereto. When the upper body is rotated, rod or shaft 53 is rotated around the shaft 59 along with the deck in a horizontal plane. Gear 64 must roll on gear 65 in the direction indicated by the arrow thereon. Gear 64 now turns gears 57 and 58 on the stationary shaft 59. This causes gear 60, shaft 61, gears 62 and 63 and the shaft 29 to rotate in the direction shown thereby showing that the steering wheels 6 and 7 will not be moved in response to the swinging of the upper deck or body. The ratios of the various gears 64, 57, 58, 60, 62, 63, 31 and 32 are so chosen that the rotation of the upper body or deck and the action of the motor 39 will be synchronized so that the gearing will freely mesh for accomplishing the desired positioning of the deck relative to the wheels 6 and 7 whether by swinging the upper body or by operating the motor 39.

The action in Figs. 4 and 5 is identical except that gear 69 corresponding to gear 64 is rotated directly by reason of crank action rather than by relative bodily motion of the one gear with respect to the other as in Fig. 1.

That which is regarded new, novel and useful and which is sought to be protected by Letters Patent of the United States is as follows:

1. In a steering control; a wheeled chassis having a pivoted forward wheel assembly thereon; a rod connected to said pivoted wheel assembly; a deck; a swing mechanism for said deck; means journaling said deck on said chassis; a hollow shaft within said journaling means; a second shaft rotatable within said hollow shaft; a translating means connecting said rod and said second shaft; a first gear fixed to said second shaft; a second gear rotatably supported on said second shaft and operatively connected to the swing mechanism for said deck; a bar element pivoted on said second shaft; a pressure fluid motor secured to said deck; means connecting said motor and said bar; a third gear rotatably supported on said bar and engaging said first and second gears; said third gear rolling on said first gear while said deck swings; and when said bar is pivoted by said motor said bar rolls said third gear relative to said second gear and rotates said first gear and the second shaft connected thereto to thereby twist said forward wheel assembly.

2. In a steering control; a wheeled chassis including a pivoted forward wheel assembly; a rod connected to said forward wheel assembly; a deck; a swing mechanism for said deck; means journaling said deck on said chassis; a hollow shaft concentrically disposed on said journaling means; a shaft rotatably supported in said hollow shaft; motion translating means connecting said shaft and said rod; a bar element pivoted to said shaft; a reciprocating pressure fluid motor securable to said deck; a sphere joint connecting said bar and the piston rod of said motor; a first gear means rotatably supported on said shaft and adapted to engage the swing mechanism for said deck; a second gear fixed to said shaft; a third gear rotatably supported on said bar meshing with said first and second gears; and said third gear adapted to roll relative to said first gear when said motor pivots said bar to twist said forward wheels, and to roll relative to said second gear when said deck rotates on said chassis.

3. In a steering mechanism for a portable hoist or excavator; a wheeled chassis having a pivoted forward wheel assembly for steering said chassis; a deck; a swing mechanism for said deck; a journal to rotatably support said deck on said chassis; a rod axially disposed in said journal; means connecting said rod and said forward wheel assembly; a motor fixed to and mounted on said deck; means to control said motor to reversibly operate same; means connecting said motor and said rod which includes a gear mechanism; means to associate said gear mechanism with the swing transmission of the hoist; the swing mechanism holding said gear mechanism when said motor operates to pivot said forward wheels; and said last mentioned means operable in any rotative position of said deck relative to said chassis while said deck is at rest.

4. In a steering mechanism for a portable hoist or excavator; a wheeled chassis having a pivoted forward wheel assembly for steering said chassis; a deck; means to rotate said deck; a journal to rotatably support said deck on said chassis; a rod axially disposed in said journal; means connecting said rod and said forward wheel assembly; a motor mounted on said deck; means connecting said motor and said rod which includes a gear device one side of which is connected to the deck rotating mechanism; means to control said motor; and said motor operative in any rotative position of said deck relative to said chassis while said deck is at rest, said deck rotating mechanism holding said one side of said gear device to enable said motor to pivot said wheel assembly, and said wheel assembly holding the other side of said gear device when said deck is rotated.

5. In a steering apparatus for a portable hoist or excavator; a wheeled chassis in which the forward wheels are pivoted; a deck; a journal associating said deck and chassis to enable said deck to rotate with respect to said chassis; a shaft axially disposed in said journal; means connecting said shaft and said pivoted wheels; a gear device on said shaft; means connecting the gear device and the swing mechanism for said deck; one side of said gear device secured to said shaft; and means to rotate said one side of said gear device with respect to the other side thereof to pivot said forward wheels to steer said chassis and said last mentioned means holding said forward wheels in adjusted position when said deck rotates, said last mentioned means operable in any rotated position of said deck relative to said chassis while said deck is at rest.

6. In a steering apparatus for a portable hoist or excavator; a chassis having a pivoted forward wheel assembly to steer same; a deck; means to rotatably mount said deck on said chassis which includes a journal; a shaft axially disposed in said journal; means to transmit motion from said shaft to said pivoted forward wheel assembly; means to rotate said shaft which includes a gear device and a motor; means to hold one side of said gear device at rest while said motor rotates the other side of said device, said other side connected to said shaft, and means to hold said other side at rest relative to said motor when said deck rotates; and means to reversely operate said motor.

7. In a steering apparatus for a portable hoist or excavator; a chassis having a pivoted forward wheel assembly; a deck; journal means to rotatably mount said deck on said chassis; a shaft transversely disposed with respect to said deck; means to transmit motion imposed on said shaft to said forward wheel assembly; means to rotate said shaft which includes a gear device one part of which is rotatable relative to said shaft and the other part of which is fixed to said shaft and means connecting said parts; a reversible motor to actuate said connecting means mounted on said deck; said part rotatable with respect to said shaft connectable to the deck rotating means; and said motor and said gear device so constructed and arranged as to be operable in any rotative position of said deck relative to said chassis while said chassis is at rest.

8. In a steering control, a chassis having a pivoted forward wheel assembly to steer same; a deck journaled on said chassis; a motor mounted on said deck; a shaft disposed substantially parallel to the axis of rotation of said deck; a gear mechanism; swing mechanism for said deck; means associating one side of said gear mechanism and said swing mechanism; means to operatively associate the other side of said gear mechanism with said pivoted wheel assembly; and means to associate said gear mechanism and said motor; said swing mechanism holding one side of said gear mechanism against rotation when said motor is actuated to pivot said forward wheels; and said pivoted wheel assembly holding the other side of said gear mechanism when said swing mechanism swings said deck.

9. In a steering control, a chassis having a pivoted wheel assembly thereon; a deck; means to journal said deck on said chassis; a shaft; a gear device associated with said shaft, said gear device comprising a three gear device; a swing transmission for said deck; means to connect one of said gears and said swing transmission; means to operatively connect the second of said gears and said pivoted wheel assembly; a motor on said deck; and means to operatively associate said motor and the third of said gears, said swing transmission holding said gear device when said motor is actuated to pivot said forward wheels.

10. In a steering control, a chassis having a pivoted forward wheel assembly thereon to steer said chassis; a deck; means to journal said deck on said chassis; a shaft in said means; gear means comprising three associated gears associated with said shaft, one of said gears fixed to said shaft and holding said shaft in said means; a swing transmission for said deck; means connecting a second of said gears and said swing transmission; means connecting said shaft and said pivoted wheel assembly; and a reversible motor on said deck operatively associated with the third gear of said gear device; said motor when actuated causing said third gear to be rotated to thereby pivot said wheel assembly while said swing transmission holds said second gear against rotation to enable the other two of said gears to roll relatively to each other.

11. In a steering control, a chassis having a pivoted wheel assembly thereon; a deck; means to journal said deck on said chassis; a shaft concentrically disposed in said means; a first gear fixed to said shaft; a second gear rotatably mounted on said shaft; a third gear meshing with said first and second gears; a reversible motor on said deck; a rod on which said third gear is mounted, said rod movable about said shaft as an axis; a swing transmission for said deck; means connecting said swing transmission and said second gear; means connecting said shaft and said pivoted wheel assembly; and means operatively connecting said motor and said rod, said motor when actuated rotating said first gear to pivot said wheel assembly and thereby steer said chassis while said second gear is held against rotation by said swing transmission.

12. In a steering control, a chassis having a pivoted wheel assembly thereon; a deck; means to rotatably support said deck on said chassis; a shaft concentrically disposed in said means; a first gear fixed to said shaft, said gear engaging said means to hold said shaft in position; a second gear rotatably supported on said shaft; a third gear engaging said first and second gear; a rod pivotably mounted on said shaft, said third gear rotatably mounted on said rod; a reversible motor on said deck; means connecting said motor and said rod to rotate said rod about said shaft as an axis; a swing transmission for said deck; means connecting said second gear and said swing transmission; and means connecting said shaft and pivoted wheel assembly; said motor when actuated bodily moving said third gear about said shaft causing it to rotate said first gear to thereby pivot said wheel assembly, said second gear held against rotation by said swing transmission.

13. In a steering control; a chassis having a pivoted wheel assembly thereon; a deck; means to journal said deck on said chassis; a reversible pressure fluid motor on said deck; a first shaft in said means; a first gear fixed to said shaft; a second gear rotatably mounted on said first shaft; a third gear engaging said first and second gear; means to rotatably support a second shaft at right angles to said first shaft, said third gear secured to said second shaft; means connecting said second shaft and said motor to reversibly rotate said shafts; a transmission to swing said deck; means connecting said transmission and said second gear; and means connecting said first shaft and said pivoted wheel assembly; said motor when actuated rotating said third gear and rotating said first shaft while said second gear is held against rotation by said swing transmission.

14. In a steering control, a chassis having a wheel assembly with which to steer said chassis; a deck rotatably mounted on said chassis; a first shaft carried on said deck; means to connect said first shaft with said forward wheel assembly; a first gear fixed to said first shaft; a second gear rotatably mounted on said first shaft; a second shaft supported on said first shaft for rotation about an axis at right angles to the axis of rotation of said first shaft; a third gear fixed to said second shaft and engaging said first and second gears; a transmission to swing said deck; means to connect said second gear and said transmission; and means to connect said motor and said second shaft to rotate the latter to thereby rotate said first shaft while said second gear is held against rotation by said transmission.

15. In a steering mechanism for a portable hoist or excavator; a wheeled chassis having a pivoted forward wheel assembly for steering said chassis; a deck; means to journal said deck on said chassis; means to rotate said deck on said chassis; a rod axially disposed in said journal means; means connecting said rod and said forward wheel assembly; a motor mounted on said deck; means connecting said motor and said rod; which includes a gear mechanism one side of which is connected to deck rotating means and in which said deck rotating means prevents motion in a part of said gear mechanism to enable said motor when actuated to pivot said wheel assembly; and means to control the direction of movement of said motor.

16. In a steering mechanism for a portable hoist or excavator; a chassis having a pivoted forward wheel assembly to steer same; a deck journaled on said chassis; a reversibly operable motor mounted on said deck; a shaft disposed substantially parallel to the axis of rotation of said deck; a gear mechanism; a swing mechanism for said deck; means associating one side of said gear mechanism with said swing mechanism; means associating the other side of said gear mechanism with said shaft; and means associating said gear mechanism with said motor; said swing mechanism holding one side of said gear mechanism while said motor actuates the other side of said gear mechanism to thereby pivot said forward wheels.

EDGAR W. BARNHART.

REFERENCES CITED

The following references are of record in the file of this patent:

UNITED STATES PATENTS

| Number | Name | Date |
|--------|------|------|
| 1,100,080 | King et al. | June 16, 1914 |
| 1,393,119 | Harris | Oct. 11, 1921 |
| 1,518,808 | Moore | Dec. 9, 1924 |
| 1,845,161 | Lewis | Feb. 16, 1932 |